United States Patent
Mahar et al.

(10) Patent No.: US 10,764,079 B2
(45) Date of Patent: Sep. 1, 2020

(54) SYSTEM AND METHODS FOR CORRELATING SLEEP DATA TO SECURITY AND/OR AUTOMATION SYSTEM OPERATIONS

(71) Applicant: Vivint, Inc., Provo, UT (US)

(72) Inventors: Matthew Mahar, Salt Lake City, UT (US); Matthew J. Eyring, Provo, UT (US); Clint Gordon-Carroll, Orem, UT (US); Jeremy B. Warren, Draper, UT (US); James Ellis Nye, Alpine, UT (US); Jefferson Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 550 days.

(21) Appl. No.: 14/617,750

(22) Filed: Feb. 9, 2015

(65) Prior Publication Data
US 2016/0234034 A1    Aug. 11, 2016

(51) Int. Cl.
*H04L 12/28* (2006.01)
*G05B 15/02* (2006.01)

(52) U.S. Cl.
CPC .......... *H04L 12/282* (2013.01); *G05B 15/02* (2013.01); *H04L 12/2829* (2013.01); *G05B 2219/2642* (2013.01)

(58) Field of Classification Search
CPC .............. H04L 12/282; H04L 12/2823; H04L 12/2829; G05B 15/02; G05B 2219/2642; F24F 2011/0065; F24F 2011/0064; F24F 2011/0071; F24F 2011/0075
USPC ........................................................ 700/275
See application file for complete search history.

(56) References Cited

U.S. PATENT DOCUMENTS

| | | | |
|---|---|---|---|
| 7,868,757 B2 | 1/2011 | Radivojevic et al. | |
| 8,654,936 B1 | 2/2014 | Eslambolchi et al. | |
| 8,696,569 B2 | 4/2014 | Yuen et al. | |
| 2004/0030531 A1 | 2/2004 | Miller et al. | |
| 2005/0035855 A1 | 2/2005 | Sarnowsky | |
| 2005/0143617 A1* | 6/2005 | Auphan ................. | A61B 5/08 600/26 |

(Continued)

FOREIGN PATENT DOCUMENTS

KR    10-2006-0076829 A    7/2006

OTHER PUBLICATIONS

Sikandar et al., SMS Based Wireless Home Appliance Control System (HACS) for Automating Appliances and Security, Issues in Informing Science and Information Technology, vol. 6, 2009.

(Continued)

*Primary Examiner* — Jigneshkumar C Patel
(74) *Attorney, Agent, or Firm* — Holland & Hart, LLP

(57) ABSTRACT

A method for security and/or automation systems is described. In one embodiment, the method may include receiving input regarding at least one home automation system operation profile. The method may further include receiving monitored sleep data of at least one user of a home automation system associated with the at least one home automation system operation profile. The method may further include comparing the received monitored sleep data with the received input regarding the at least one home automation system operation profile, and may include implementing the at least one home automation system operation profile based, at least in part, on the comparing.

17 Claims, 7 Drawing Sheets

(56) References Cited

U.S. PATENT DOCUMENTS

| | | | |
|---|---|---|---|
| 2006/0142968 A1 | 6/2006 | Han et al. | |
| 2007/0129769 A1* | 6/2007 | Bourget | A61B 5/0002 |
| | | | 607/45 |
| 2008/0074258 A1 | 3/2008 | Bennett, III et al. | |
| 2010/0321151 A1 | 12/2010 | Matsuura et al. | |
| 2011/0010014 A1* | 1/2011 | Oexman | A47C 27/061 |
| | | | 700/276 |
| 2013/0073094 A1 | 3/2013 | Knapton et al. | |
| 2013/0166073 A1* | 6/2013 | Pine | F24F 11/0034 |
| | | | 700/276 |
| 2013/0204408 A1 | 8/2013 | Thiruvengada et al. | |
| 2013/0234823 A1 | 9/2013 | Kahn et al. | |
| 2013/0261404 A1 | 10/2013 | Sato et al. | |
| 2014/0232556 A1 | 8/2014 | Williams | |
| 2014/0269223 A1 | 9/2014 | Mokhnatkina et al. | |
| 2014/0334653 A1* | 11/2014 | Luna | G05B 15/02 |
| | | | 381/332 |
| 2016/0089078 A1* | 3/2016 | Du | A61B 5/4812 |
| | | | 600/301 |
| 2016/0136385 A1* | 5/2016 | Scorcioni | A61M 21/02 |
| | | | 600/26 |

OTHER PUBLICATIONS

International Search Report for PCT International Application No. PCT/US2016/014895, dated May 2, 2016 (3 pp.).
Withings Aura, obtained from http://www.withings.com/eu/withings-aura.html#, on Mar. 2, 2015.
Extended European Search Report for EP Application No. 16749585.2, dated May 29, 2018.

\* cited by examiner

SYSTEM AND METHODS FOR CORRELATING SLEEP DATA TO SECURITY AND/OR AUTOMATION SYSTEM OPERATIONS

BACKGROUND

The present disclosure, for example, relates to a security and/or automation system, and more particularly to implementing at least one home automation system operation profile based, at least in part, on comparing received monitored sleep data with a received input regarding at least one home automation system operation profile.

Home automation systems are widely deployed to provide various types of communication and functional features such as monitoring, communication, notification, and/or others. These systems may be capable of supporting communication with a user through a communication connection or a system management action.

Typical homeowners are concerned with a multitude of home safety details as they close down their homes for the night and go to sleep; they must consider whether they have locked all the doors, turned off all the lights, set the security alarm, ensured that all occupants are safely in their rooms, etc. Currently, each of these steps must be taken individually and manually to ensure that the home is properly secured. Existing home automation systems may allow for these security steps to be activated based on user input at a home automation panel or dedicated application on a computer or smartphone. However, requiring user input depends upon the homeowner remembering to take each of those steps; if the homeowner forgets, the system remains disarmed, lights remain on, doors remain unlocked, etc. Similarly, current homeowners must make manual adjustments to lighting, temperature settings, motion sensor activation or deactivation, and the like before they go to sleep, or when they wake up in the middle of the night, or in the morning.

SUMMARY

Existing sleep monitoring systems may provide means for healthcare workers, in particular, to monitor whether a patient is in or out of the bed, or is attempting to get out of the bed, for example using a bed pad sensor. Other body-worn or smartphone-based sleep monitoring systems intended for home use may monitor a user's quality of sleep based on detected movements of the bed or system during the night, indicating that the user was tossing and turning, or detecting sounds of snoring, uneven breathing, and the like. These systems may also provide a sleep summary in the morning based on the detected sleep conditions, to provide information detailing the quality of sleep the user experienced. Yet many of these systems must be activated manually, which adds yet another item to a homeowner's to-do list prior to going to bed. In addition, these sleep monitoring systems may not be tied to the homeowner's home automation systems, and therefore the functionality and usefulness of these sleep monitoring systems is limited.

It may therefore be desirable to provide a method by which home automation system features may be secured, activated, armed, and otherwise operated based on the homeowner's decision to go to sleep. In addition, it may be desirable to provide a method by which the same or additional home automation system features may be deactivated, disarmed, adjusted, and otherwise operated based on the homeowner's current sleep status, and when he awakens. It may further be desirable to provide a home automation system operation profile such that a host of home automation system operations may be initiated based on the homeowner's sleep status, rather than requiring various aspects of a home automation system to be activated or operated individually.

Accordingly, in one embodiment, a method for security and/or automation systems is provided. In one embodiment, the method may comprise receiving input regarding at least one home automation system operation profile. The method may further comprise receiving monitored sleep data of at least one user of a home automation system associated with the at least one home automation system operation profile, and comparing the received monitored sleep data with the received input regarding the at least one home automation system operation profile. The method may further comprise implementing the at least one home automation system operation profile based, at least in part, on the comparing.

Sleep data may be monitored by any known means, such as using a bed sensor pad, a body-worn device, or a dedicated application on a smartphone or personal computer. Monitored sleep data may include user movement, weight or pressure, detected audio, heart rate, respiration rate, body temperature, and the like. In some embodiments, home automation systems may be operated based on user presence in the bed, detected for example using weight or movement sensors positioned on or under the mattress. In other embodiments, home automation systems may be operated based on the user's status as being asleep or awake. In still other embodiments, home automation systems may be operated based on the user's sleep status with regard to quality of sleep and current position in the sleep cycle. In further embodiments, user data may be monitored to determine user wellness; for example, by monitoring user or bed temperature, user audio related to coughing, or the like, for example using a bed pad sensor under the mattress or a body-worn sensor, it may be determined that the user is sick in bed.

Based on the user's detected sleep data, a multitude of home automation system functions may be operated as part of a home automation system operation profile. For example, home security systems may be activated upon detecting that a user has gotten into bed, using weight or pressure sensors in or under the bed. Thus, upon getting into bed at the end of the day, the user need not remember to lock the doors, turn off the lights, set the thermostat, arm the security system, and the like. Rather, the home automation system may perform the entire home securing operation profile automatically. While some home automation systems may allow for scheduled thermostat and security system settings, these schedules lack flexibility with regard to a user's varying schedule. A user may choose to stay up later working, or may not get home at his usual time, and the system may prematurely turn off lights or arm the security system without accounting for these variations. It may therefore be desirable to provide an adaptive means of operating home automation system functions by tailoring the operations to whenever the user climbs into bed.

In some embodiments, home automation system functions or operation profiles may only operate when all known home occupants are in bed, using a plurality of bed or personal sensor units. In other embodiments, the home automation system may account for home occupants who are out of town, detected based on manual user input, integrated calendars, or global positioning systems, such that the absent occupant's presence in his bed is not needed to operate system functions. In some embodiments, an alert may be communicated to a user indicating that certain home automation system operations will be initiated despite various home occupants' absence.

In other embodiments, various home automation systems may operate based on a user's sleep status. For example, certain home automation system functions, such as adjusting lighting or thermostat settings, or arming and disarming security systems, may operate only upon detecting that the user has fallen asleep, or upon detecting that the user has awoken. In other embodiments, home automation systems may operate based on the user's changing status while asleep. For example, thermostat settings may be updated throughout the night based on monitored user body temperatures, movement, detected audio such as snoring or uneven breathing, and the like. Thus, the system may automatically detect a need to lower the room temperature based on observing a user tossing and turning or becoming overheated, without the need for the user to wake up and manually adjust the thermostat. In addition, the home automation system may adjust alarm clock settings, thermostat settings, lighting settings, and the like, to coincide with the user's detected sleep cycle status. For example, the sleep monitoring system may detect at 5:45 am that the user is in a lighter stage of his sleep cycle, based on detected user movement, body temperature, sound, and the like. Thus, while the user may have set his alarm to wake him up at 6:00 am, the home automation system may instead begin slowly dimming up lights in the bedroom, increasing the room temperature, emitting increasingly louder alarm sounds, and the like, to ensure that the user is awoken at the ideal time during his sleep cycle. The home automation system may also deactivate security systems, such as motion sensors, in anticipation of the user getting out of bed and walking through the house.

In some embodiments, where user data monitoring indicates that the user is sick (or asleep), for example by detecting user coughing or increased user temperature, the home automation system may operate various functions to accommodate the user's unwell state. For example, the system may communicate an action instruction to the doorbell system to silence any doorbell chimes, or may communicate an action instruction to the user's alarm clock to disable the alarm. Various other system operations, which in some embodiments may be performed based upon user-inputted preferences, are also envisioned.

In still other embodiments, the home automation system may operate various functions in anticipation of user activities. For example, a sleep sensor in a baby's crib may detect that the baby has awoken and is crying. In anticipation of the parent walking down the hall to the nursery, the home automation system may dim up lights and deactivate motion detectors in the hallway or nursery.

The user may input preferences for various home automation system operation profiles tied to various monitored sleep statuses. For example, a user may indicate that he wants the doors locked, the interior lights off, the exterior lights on, the thermostat set to 68 degrees, and the security system armed when the system detects that he has gone to bed. The user may further indicate that he wants the thermostat decreased by two degrees during the night if the system detects that he is sleeping restlessly, as indicated by, for example, monitored body temperature, motion, sound, or the like. Furthermore, the user may indicate that he wants the hallway lights turned on and the motion sensors deactivated when the system detects that his baby has awoken, so that the user may safely walk down the hallway to the nursery to care for his child without triggering alarms. Further still, the user may input a profile for when he wakes up in the morning, in which the system may turn on various lights in the home, deactivate motion sensors, turn off outdoor lights, increase the thermostat setting, and the like. Any variations of home automation system operation profiles are envisioned, and any components of the home automation system may be operated.

In some embodiments, the home automation system may detect patterns in the user's input at the home automation system in order to derive home automation system operation profiles without the need for the user to manually input such profiles. For example, the system may detect a pattern, in that the user turns on all interior lights, disarms motion sensors, and increases the thermostat setting to 70 degrees every morning when he wakes up. The home automation system may accordingly derive a "wakeup profile" to implement each of those individual functionalities each morning upon detecting that the user has awoken.

In some embodiments, users may be provided with a report in the morning, for example at a control panel, or in a dedicated application on a smartphone or personal computer, detailing each home occupant's sleep data and providing other relevant home automation system information. The sleep report may further provide information regarding occupants' current sleep status, for example to indicate to the user which family members are still asleep, or are awake but still in bed.

In some embodiments, changes to home automation system operations may require user confirmation in, for example, a dedicated application on a smartphone or personal computer. In other embodiments, the operations may be performed automatically based on sleep data triggers without necessitating user input. In some embodiments, users may input preferences and thresholds at the home automation system with regard to home automation system operations and corresponding triggers. For example, a user may indicate that security systems should be activated when particular household occupants are in bed, even when not all occupants are in bed, or the like.

In some embodiments, rather than, or in addition to, implementing one or more home automation system operation profiles based on detected sleep data, various operation profiles may be implemented based, at least in part, on one or more of a detected user location or user movement, or a detected user verbal or gesture-based command. For example, a user may speak, "Vivint, I'm leaving," as he is exciting his home, or may announce, "Vivint, I'm home," as he approaches the front door. In other embodiments, the user may wave his hand or perform another hand or bodily gesture to communicate an operation command to the home automation system. One or more sensor units may detect the verbal or gestural command, and may authenticate the user on the basis of, for example, voice identification and/or facial recognition technologies. In some embodiments, the one or more sensor units may additionally or alternatively identify a user using detected biosignatures, or by receiving wireless signals from, for example, a smartphone in the user's possession and authenticated to the user. By authenticating the speaking or gesturing user, the home automation system may ensure that unauthorized persons may not gain access to the home simply by utilizing the authorized user's gesture or verbal command phrase. In some embodiments, as a result of receiving a command from an unauthorized user, an alarm may be triggered. In addition, various operation profiles specific to particular users may be implemented based on the identified user, even where all users perform the same gesture or speak the same command. In other embodiments, one or more sensor units may detect that the user is moving toward the front door from the inside or outside of the home to either exit or enter the home. On the basis of the detected command or location of the user, the home automation system may implement one or more home automation system operation profiles, such as, for example, a "home lockup profile" or a "return home profile."

The various system operation profiles may be based upon user inputted preferences, or may be derived automatically by the system based on observed user patterns. For example, the home automation system may observe that the user always turns down the thermostat, turns off the interior lights, turns on the exterior lights, arms the security system, and locks the front door when he leaves his home. Accordingly, upon detecting that the user is leaving the home or has left the home, the home automation system may implement a derived "home lockup profile" based on the observed user patterns. In this way, the user need not input directly at the home automation system preferences relating to one or more home automation system operation profiles. Furthermore, a forgetful user who often neglects to lock his door, or a user with his hands full, may secure or gain access to his home without the need to locate his key, input a code, turn on and off lights, etc.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to providing a means for monitoring sleep data of users in a home, and comparing the monitored sleep data to received input regarding at least one home automation system operation profile. Moreover, the systems and methods described herein relate to implementing at least one home automation system operation profile based, at least in part, on comparing the monitored sleep data to the received input regarding the home automation system operation profiles.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
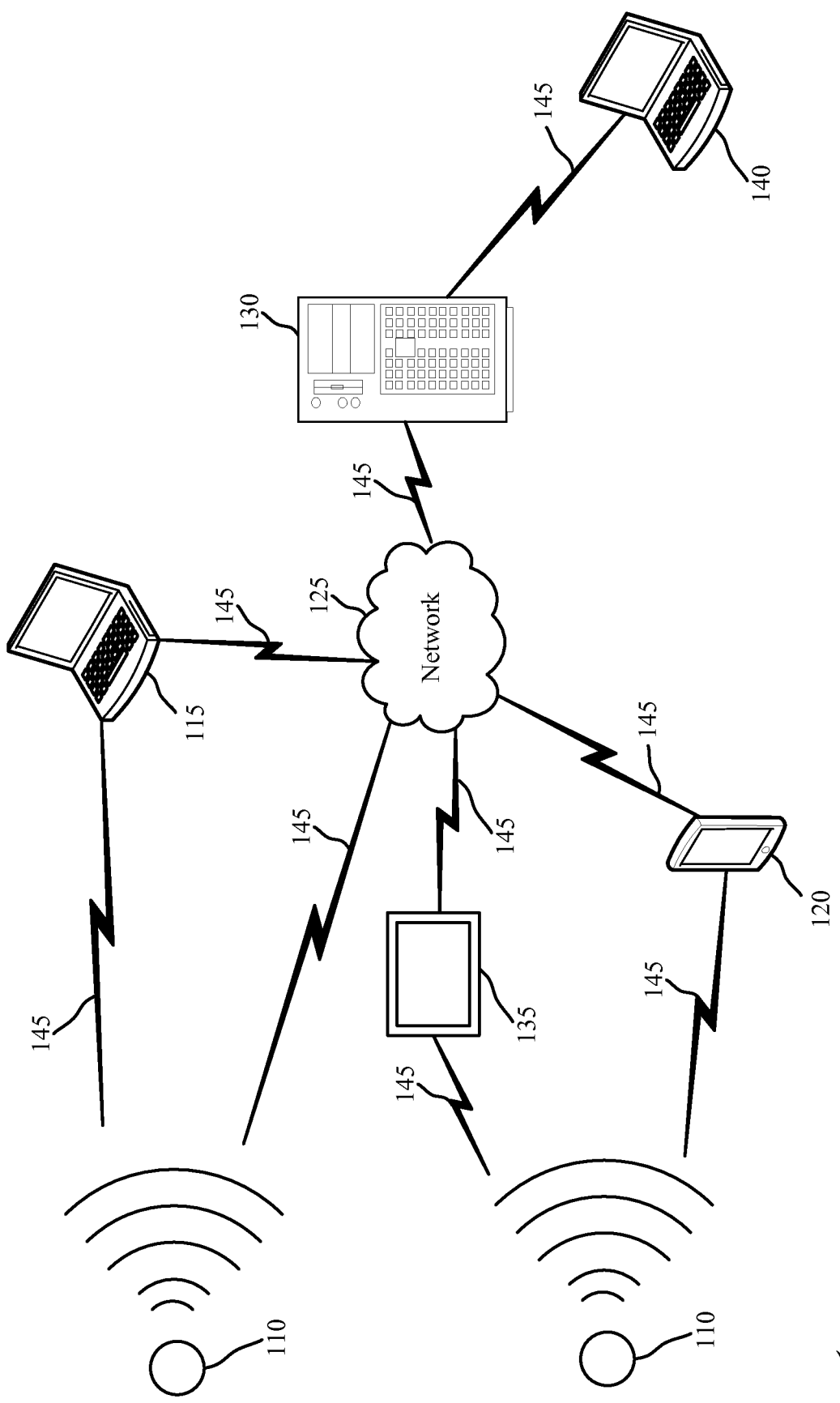
FIG. 1 is a block diagram of an example of a security and/or automation system, in accordance with various embodiments.

FIG. 1 is an example of a home automation system 100 in accordance with various aspects of the disclosure. In some embodiments, the home automation system 100 may include one or more sensor units 110, a local computing device 115, 120, a network 125, a server 130, a control panel 135, and a remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a backend server 130—directly and/or indirectly—using one or more communication links 145.

The control panel 135 may wirelessly communicate via communication links 145 with the local computing device 115, 120 via one or more antennas. The control panel 135 may provide communication coverage for a geographic coverage area. In some examples, control panel 135 may be referred to as a control device, a base transceiver station, a radio base station, an access point, a radio transceiver, a home automation control panel, a smart home panel, a security panel, or some other suitable terminology. The geographic coverage area for control panel 135 may be divided into sectors making up only a portion of the coverage area. The home automation system 100 may include one or more control panels 135 of different types. The control panel 135 may be related to one or more discrete structures (e.g., a home, a business) and each of the one more discrete structures may be related to one or more discrete areas. Control panel 135 may be a home automation system control panel, for example an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

In any embodiment, control panel 135 may comprise a comparing module, described in more detail below with respect to FIGS. 2-3. The control panel 135 may be operable to receive input regarding at least one home automation system operation profile, and to receive monitored sleep data of at least one user from the one or more sensor units 110. The control panel 135 may further be operable to compare the received monitored sleep data with the received input regarding the at least one home automation system operation profile, and implement the at least one home automation system operation profile based, at least in part, on the comparing.

In some embodiments, control panel 135 may comprise one or more sensor units such that control panel 135 may directly monitor sleep data of the at least one user. In other embodiments, control panel 135 may receive monitored sleep data from one or more sensor unit 110, from a local computing device 115, 120, or from a remote computing device 140.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A computing device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A computing device 115, 120 or 140 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A local computing device 115, 120, remote computing device 140, and/or control panel 135 may include and/or be one or more sensors that sense: proximity, motion, temperatures, vibration, humidity, sound level or auditory input, smoke, structural features (e.g., glass breaking, window position, door position), time, geo-location data of a user and/or a device, distance, biometrics, weight, speed, height, size, preferences, light, darkness, weather, time, system performance, status in a sleep cycle, heart rate, respiration rate, and/or other inputs that relate to a home automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to home automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or local computing devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each local computing device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or, and other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110, or to receive a status report or message relating to the monitored sleep data as compared with the input regarding the at least one home automation system operation profile. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to sleep data of at least one authorized user. Each sensor unit 110 may be capable of sensing multiple sleep data parameters, or alternatively, separate sensor units 110 may monitor separate sleep data parameters. For example, one sensor unit 110 may be a bed pad sensor, configured to measure user presence in a bed based on detected pressure or weight, while another sensor unit 110 (or, in some embodiments, the same sensor unit 110) may detect user sleep data via heat or heartbeat monitoring. In some embodiments, one or more sensor units 110 may additionally monitor alternate user sleep data parameters, such as using audio monitors, motion sensors, or the like. In alternate embodiments, a user may input sleep data directly at the local computing device 115, 120 or at remote computing device 140. For example, a user may input at his smartphone that he has gotten into bed, that he is going to sleep, or that he has woken up. In another example, a user may input sleep data regarding other occupants of the home, for example indicating that his children are in bed and asleep, or that his wife is out of town and should not be taken into account in implementing the at least one home automation system operation profile. In some embodiments, user input relating to sleep data may be processed in conjunction with sleep data monitored using one or more sensor units 110.

In some embodiments, one or more sensor units 110 may alternatively or in addition be operable to detect any of auditory commands, gestural commands, user movement, or user location, or a combination thereof. For example, one or more sensor units 110 may detect a verbal command spoken by the user, such as, "Vivint, I'm leaving." In another example, the same or a separate sensor unit 110 may detect a gestural command given by the user, such as waving to indicate that the user is leaving his home. An additional or the same sensor unit 110 may detect a user's location with respect to an exterior door of the home, or his movement toward an exterior door of the home. On the basis of any or all of these detected user actions, at least one home automation system operation profile may be implemented.

In some embodiments, the one or more sensor units 110 may be separate from the control panel 135, and may be positioned at various locations throughout the home or property, usually in or near home occupants' beds or bedrooms, or near entry or exit points of the home or property. In other embodiments, the one or more sensor units 110 may be integrated or collocated with home automation system components or home appliances or fixtures. For example, a sensor unit 110 may be integrated with a wall outlet or switch, or may be integrated with a mattress. In still other embodiments, the one or more sensor units 110 may be integrated or collocated with the control panel 135 itself.

Data gathered by the one or more sensor units 110 may be communicated to local computing device 115, 120, which may be, in some embodiments, a thermostat or other wall-mounted input/output home automation system display. In other embodiments, local computing device 115, 120 may be a personal computer or smartphone. Where local computing device 115, 120 is a smartphone, the smartphone may have a dedicated application directed to collecting and processing user sleep data or detected user verbal commands, gestural commands, and/or location. The local computing device 115, 120 may process the data received from the one or more sensor units 110 by comparing the received sleep data or other user data to the received input regarding the at least one home automation system operation profile. The local computing device 115, 120 may then communicate an action instruction to at least one aspect of the home automation system to implement the at least one home automation system operation profile. In alternate embodiments, remote computing device 140 may process the data received from the one or more sensor units 110, via network 125 and server 130, to obtain action instructions for the at least one aspect of the home automation system. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of user sleep data based on motion detection from a sensor unit 110, a stream of user sleep data based on respiration rate monitoring from the same or a different sensor unit 110, and a stream of user sleep data received from audio monitoring at either the same or yet another sensor unit 110. In other embodiments, one or more sensor units 110 may collect and transmit a stream of user data representing a verbal or gestural command to server 130. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing user sleep data, or other user data relating to received commands or locations, received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with user sleep data.

Figure 2:
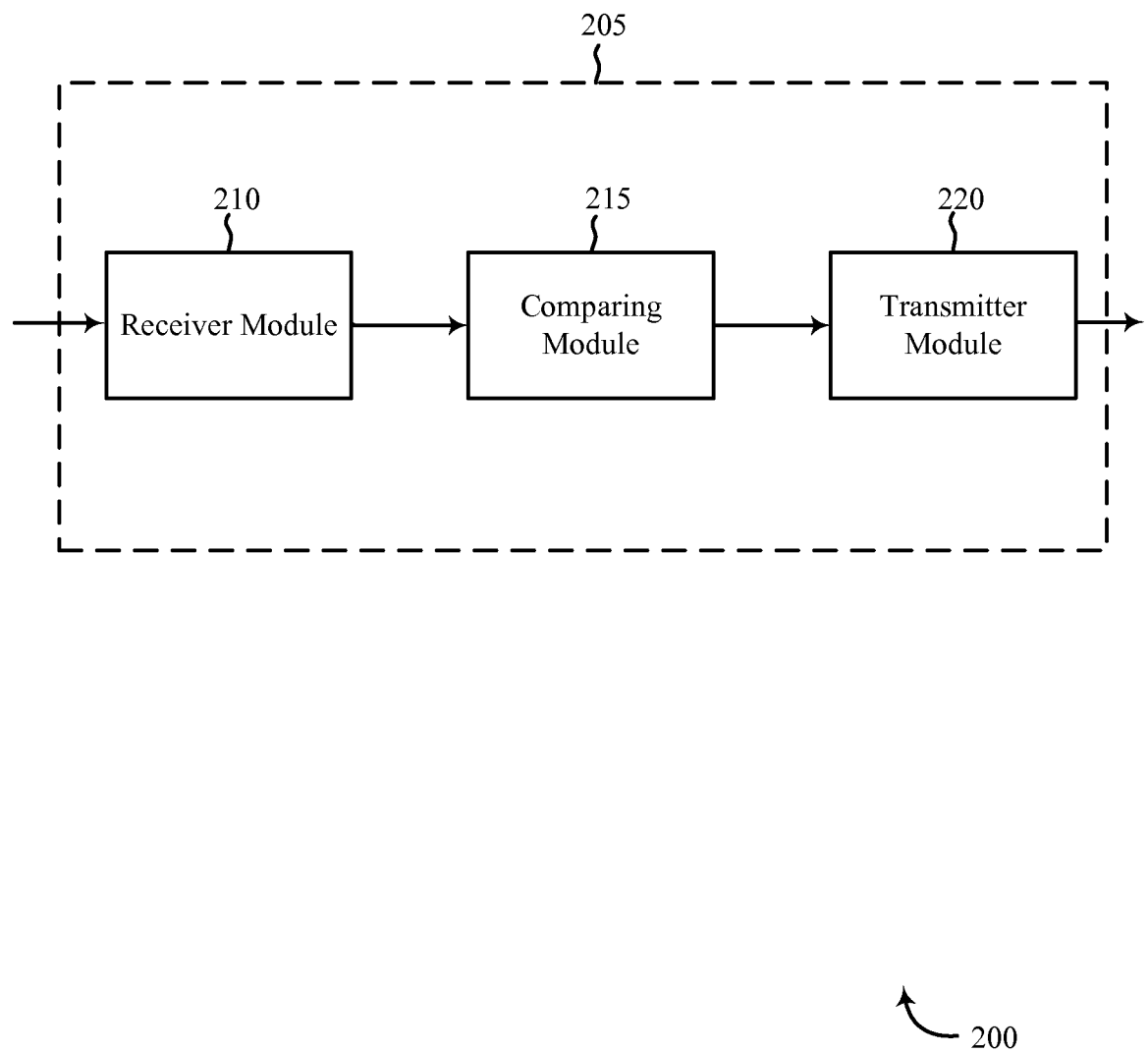
FIG. 2 shows a block diagram of a device relating to a security and/or automation system, in accordance with various aspects of this disclosure.

FIG. 2 shows a block diagram 200 of an apparatus 205 for use in security and/or automation systems, in accordance with various aspects of this disclosure. The apparatus 205 may be an example of one or more aspects of a control panel 135, or in other embodiments may be an example of one or more aspects of the one or more sensor units 110, or in still other embodiments may be an example of one or more aspects of the local computing device 115, 120 or remote computing device 140, each of which are described with reference to FIG. 1. The apparatus 205 may include any of a receiver module 210, a comparing module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive input regarding at least one home automation system operation profile. For example, a user may input at a control panel or in a dedicated application on a smartphone preferences relating to a "nighttime home shutdown profile," which may include, for example, activating security alarms, turning off lights, adjusting the thermostat, and the like based on detecting that all authorized home occupants are in bed. In another example, a user may input at a control panel or personal computer preferences relating to a "daytime home wakeup profile," which may include, for example, disarming security systems, turning on lights, adjusting the thermostat, and the like based on detecting that at least one authorized home occupant is awake. Various home automation system operation profiles are envisioned, and may be triggered by any variation of sleep status for one or more authorized home occupants. For example, triggers may include mere presence in bed of one or more occupant, or may require a particular sleep state of the one or more occupants. In other examples, various system operation profiles may be implemented on the basis of observed user verbal or gestural commands, or on the basis of observed user location with respect to an exterior door of the home. For example, triggers may include motion data detected by one or more sensor units indicating that a user is moving towards the front door of his home. The received motion data may be compared with a user inputted preference relating to a "home lockup profile," which may indicate that, upon detecting that a user has exited his home, the interior lights should be turned off, the thermostat should be turned down, and the exterior locks should be secured.

In some embodiments, users may input a sleep data threshold associated with at least one home automation system operation profile, wherein the home automation system operation profile is only implemented when the monitored sleep data meets or exceeds the sleep data threshold. This input may be particularly helpful to avoid false positives. For example, a user may have inputted a "wakeup profile" at the receiver module 210 indicating various functionalities of the home automation system that should be implemented upon his awakening, such as disarming security alarms, turning on lights, and the like. However, many people may awaken briefly during the night to change positions or drink some water, without being permanently awake for the day. Thus, the user may input a sleep data threshold, indicating that the system detects that he is awake for a predetermined period of time, such as 5 minutes, or that his heart rate is above a certain threshold, before implementing the at least one home automation system operation profile. In this way, users may ensure that various system operations are not activated or deactivated based on minor sleep "glitches." Similarly, a user may input an exit threshold, such that, in one example, the exterior doors lock immediately upon the user exiting the home, but that other elements of the home operation profile, such as activating the security alarm, adjusting the thermostat, and the like, are implemented only after the user has been away from his home for five minutes or more. In this way, the system may not unnecessarily implement a "home lockup profile" when, for example, a user has merely stepped outside to check the mail, or the like. In other embodiments, however, it may be preferable to activate lock-up profiles immediately upon user exit to ensure home security.

The receiver module 210 may receive monitored sleep data of the at least one user from the one or more sensor units, control panel, or local computing devices. Where apparatus 205 is one or more sensor unit, the monitored sleep data may be received at the apparatus 205 and communicated directly to the receiver module 210. In embodiments where apparatus 205 is a control panel, local computing device, or remote computing device, the monitored sleep data may be communicated, for example via a wireless communication link, from the one or more sensor unit monitoring the sleep data to the receiver module 210 at apparatus 205. Receiver module 210 may alternatively or in addition receive monitored user data relating to any of verbal commands, gestural commands, user movement, and/or user location.

The sleep data or other observed user data, and input regarding the at least one home automation system operation profile received at receiver module 210 may then be communicated to comparing module 215, which may compare the received sleep data or other user data with the received input regarding the at least one home automation system operation profile. For example, the comparing module 215 may compare the received sleep data indicating that all home occupants are asleep with a received "nighttime home shutdown profile" indicating various operations to implement when all occupants are asleep. On the basis of the comparing, the comparing module 215 may derive an action instruction indicating the various aspects of the home automation system that should be implemented according to the profile, and may then communicate the action instruction to transmitter module 220.

In any embodiment, various home automation system operation profiles may be initiated simultaneously or in series. For example, receiver module 210 may receive sleep data indicating that all home occupants are asleep, and comparing module 215 may accordingly derive an action instruction indicating that security systems should be armed, lights should be turned off, etc., in keeping with the user preferences provided in the "nighttime home shutdown profile." Receiver module 210 may then receive sleep data indicating that the baby has awoken, and comparing module 215 may accordingly derive an action instruction indicating that various lights should be turned on, motion sensors deactivated, and the like, according to user preferences provided in a "midnight wakeup profile." Those home automation system aspects implemented in the "nighttime home shutdown profile" that are not affected by the "midnight wakeup profile" may continue to operate according to the former profile, until such time as sleep data is received that coincides with another system profile. Similarly, once the requirements for the "midnight wakeup profile" are no longer met, for example once the baby is back asleep and the user is back in his bed, the system aspects affected by the "midnight wakeup profile" may return to their previous state according to the "nighttime home shutdown profile."

Transmitter module 220 may communicate the received action instruction derived at comparing module 215 to the appropriate aspect of the home automation system. For example, the action instruction may indicate that the thermostat should be set to 70 degrees. Accordingly, the transmitter module may communicate that action instruction to the thermostat, which may adjust the temperature setting accordingly. In another example, the action instruction may indicate that the security system should be armed, and the transmitter module 220 may accordingly communicate the arming action instruction to the security system.

Figure 3:
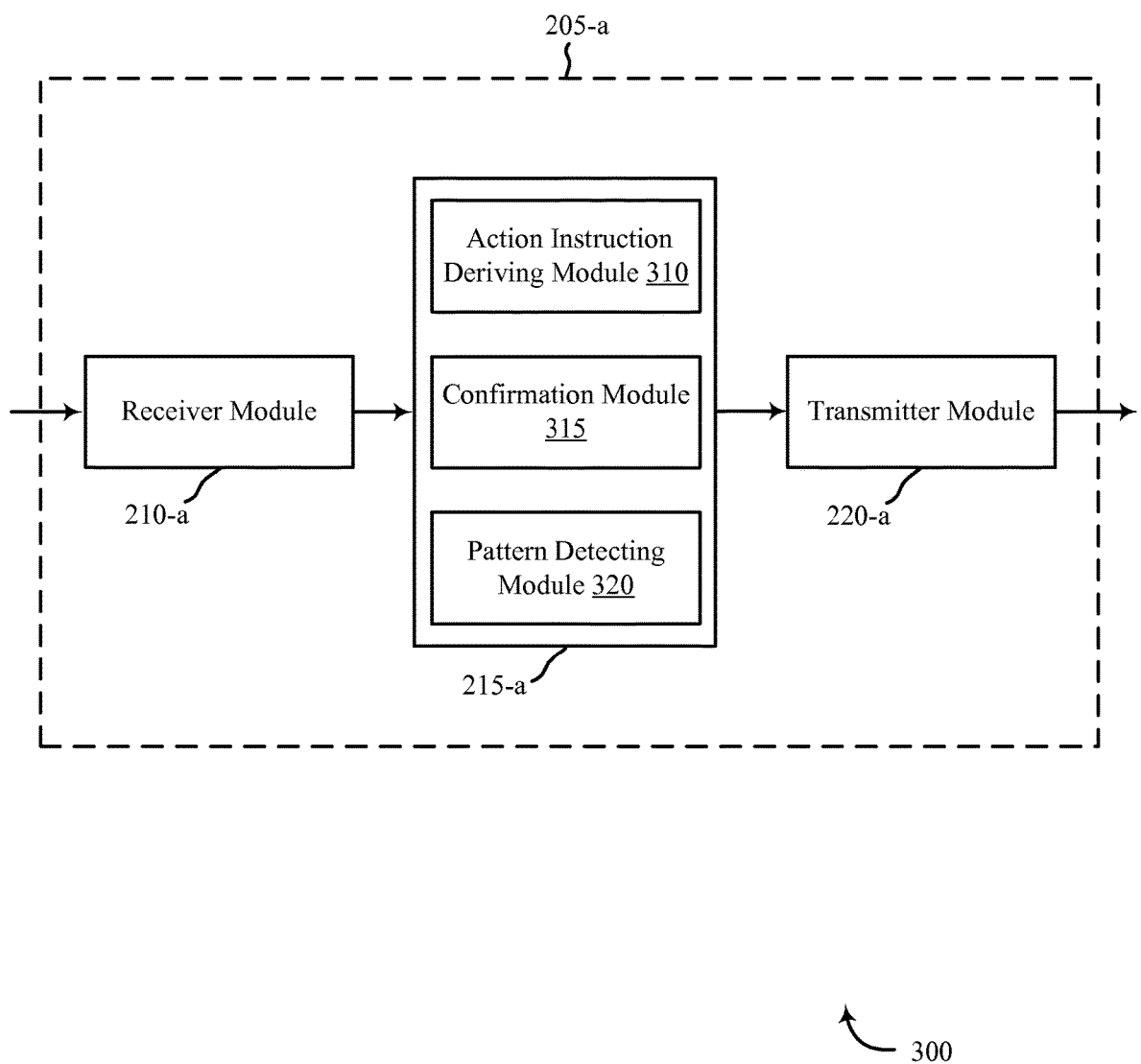
FIG. 3 shows a block diagram of a device relating to a security and/or automation system, in accordance with various aspects of this disclosure.

Apparatus 205-*a*, which may be an example of apparatus 205 illustrated in FIG. 2, is further detailed in FIG. 3. Apparatus 205-*a* may comprise any of a receiver module 210-*a*, a comparing module 215-*a*, and/or a transmitter module 220-*a*, each of which may be examples of the receiver module 210, the comparing module 215, and the transmitter module 220 as illustrated in FIG. 2. Apparatus 205-*a* may further comprise, as a component of the comparing module 215-*a*, any one or more of an action instruction deriving module 310, a confirmation module 315, or a pattern detecting module 320.

The components of apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As previously discussed, apparatus 205-*a* may be any of a control panel, a local computing device, or one or more sensor unit. Receiver module 210-*a* may operate in the same manner as described with respect to FIG. 2. Specifically, receiver module 210-*a* may receive monitored sleep data of at least one user of a home automation system. Alternatively or in addition, receiver module 210-*a* may receive monitored user data related to any of verbal commands, gestural commands, user movement, and/or user location. The sleep data or other user data may be monitored directly by the apparatus 205-*a*, or may be communicated to apparatus 205-*a* from any of one or more sensor unit, control panel, or local computing device. In other embodiments, user sleep data may be inputted directly at the apparatus 205-*a* by the user. The receiver module 210-*a* may also receive input regarding at least one home automation system operation profile.

The received monitored sleep data or other user data may be communicated from the receiver module 210-*a* to the comparing module 215-*a*. The comparing module 215-*a* may then compare the received monitored sleep data or other user data with the appropriate operation profile. For example, sleep data indicating that all home occupants are in bed may be compared with a profile relating to shutting down and securing the home at night; sleep data indicating that all home occupants are asleep may be compared with a profile relating to adjusting thermostat settings; and sleep data indicating that one or more home occupants have awoken may be compared with a profile relating to "waking up" various home automation system components. Other combinations are also possible.

Based upon comparing the received sleep data or other user data with the appropriately coinciding at least one home automation system operation profile, action instruction deriving module 310 may derive at least one appropriate action instruction for implementing the at least one home automation system operation profile. The action instructions derived by action instruction deriving module 310 may direct implementation of the operation profile by any one or more component of the home automation system, or may alternatively or in addition be directed to communicating status messages to one or more user. For example, action instruction deriving module 310 may derive a sleep status report for communication to the user at his smartphone or personal computer. Action instructions derived by action instruction deriving module 310 may be communicated to transmitter module 220-a, which may in turn communicate the action instructions to the appropriate home automation system component(s).

Comparing module 215-a may also comprise a confirmation module 315, which may operate in conjunction with the action instruction deriving module 310 to communicate a confirmation message to a user prior to transmitting the action instruction to the appropriate at least one home automation system component. For example, action instruction deriving module 310 may determine, based on the received sleep data and input regarding the at least one home automation system operation profile, that a "midnight wakeup profile" should be implemented. The confirmation module 315 may accordingly communicate a confirmation message to the user, via transmitter module 220-a, requesting user confirmation prior to implementing the "midnight wakeup profile" action instructions. A user may receive the confirmation request message at, for example, a control panel, or alternatively at a dedicated application on his smartphone or personal computer. The user may be presented in the message with a list of the actions to be taken in conjunction with the home automation system operation profile, and may approve or deny all or some of the actions accordingly. The user approval or disapproval may then be communicated to apparatus 205-a, received by receiver module 210-a, and communicated to action instruction deriving module 310 to confirm that the action instruction, in part or in its entirety, should be communicated to transmitter module 220-a for dissemination to the appropriate one or more components of the home automation system for implementation. Similarly, a user exiting his home may be presented with a confirmation message indicating the various aspects of the home automation system which will be secured as a result of his exiting, which he may then confirm or deny, for example, on a dedicated application on his smartphone. Thus, a user may be given an opportunity to confirm or deny action instructions prior to implementation. This confirmation step may be included or excluded according to individual user preferences inputted at the home automation system.

Comparing module 215-a may further comprise a pattern detecting module 320. Pattern detecting module 320 may be configured to adaptively "learn" user preferences with regard to home automation system operation profiles without the need for direct user input. For example, pattern detecting module 320 may detect over time, for example a week or a month, that a user routinely arms his alarm system, turns off all interior lights, and sets the thermostat to 68 degrees, only when all members of the household are in bed. The user routine may be detected by the home automation system, while sleep or "in bed" status of household members may be detected via, for example, one or more sensor units. According to the detected pattern, the pattern detecting module 320 may derive a "nighttime shutdown profile" without the need for direct user input of preferences relating to this profile. Similarly, pattern detecting module 320 may detect over time that a user routinely unlocks his front door, disarms his security system, turns on interior lights, and turns up his thermostat upon arriving home. According to the detected pattern, the pattern detecting module 320 may derive a "return home profile" without the need for direct user input of preferences relating to this profile, such that the derived "return home profile" may be implemented upon detecting at one or more sensor units that the user has returned home. In this way, user preferences for home automation system components may be implemented automatically without the need for the user to remember to set such preferences.

The operation profile derived at pattern detecting module 320 may be communicated to action instruction deriving module 310, which may derive an action instruction according to the derived operation profile as compared with received user sleep data or other user data. The derived action instruction may then either be communicated to the transmitter module 220-a for implementation by one or more components of the home automation system, or may alternatively be communicated to the confirmation module 315 to request user confirmation prior to implementing the home automation system operation profile, as discussed above.

Figure 4:
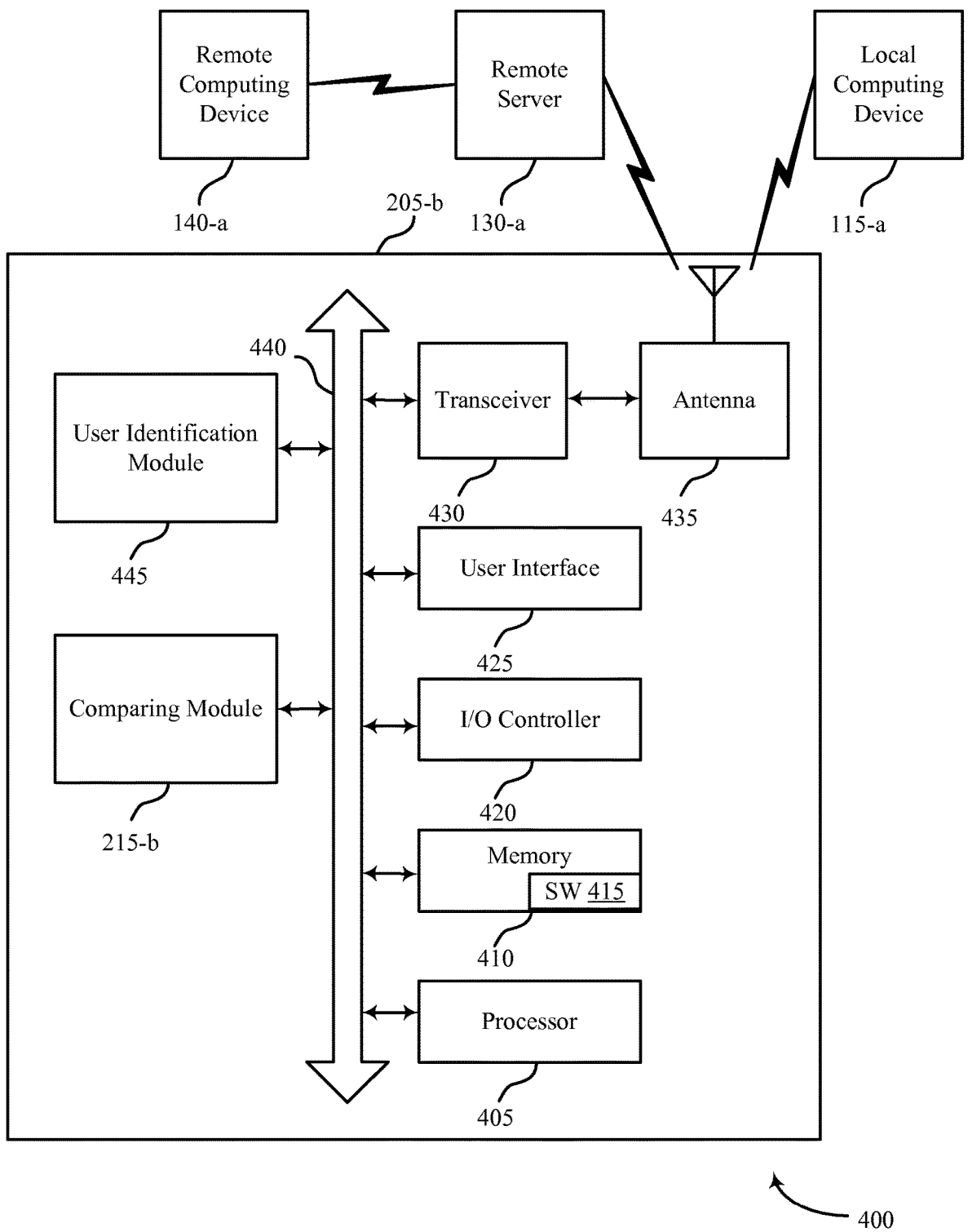
FIG. 4 shows a block diagram relating to a security and/or automation system, in accordance with various aspects of this disclosure.

FIG. 4 shows a system 400 for use in monitoring sleep data of at least one user, and comparing sleep data with received input regarding at least one home automation system operation profile, in accordance with various examples. System 400 may alternatively or in addition be operable to detect other user data, such as voice commands, gestural commands, user movement in or around the home or property, and/or user location. System 400 may include an apparatus 205-b, which may be an example of the control panel 135 or one or more sensor units 110 of FIG. 1. Apparatus 205-b may also be an example of one or more aspects of apparatus 205 and/or 205-a of FIGS. 2 and 3.

Apparatus 205-b may include a comparing module 215-b, which may be an example of the comparing module 215, 215-a described with reference to FIGS. 2 and 3. Apparatus 205-b may also include components for comparing received monitored sleep data or other user data with the received input regarding at least one home automation system operation profile, and for operating at least one aspect of the home automation system based, at least in part, on the comparing. For example, user identification module 445 may be operable to identify the user from whom the monitored sleep data has been gathered, such that the monitored sleep data or other user data may be compared with the appropriate corresponding input regarding the at least one home automation system operation profile. In one embodiment, monitored sleep data showing a user in the lightest stage of his sleep cycle may be received at the user identification module 445, which may use a variety of known identification methods to identify the sleeping user. The user identity and sleep data may then be communicated to the comparing module 215-*b*, which may compare the monitored sleep data with the received input regarding at least one home automation system operation profile for the particular identified user. For example, the received input may indicate that this particular user wants to be awakened by slowly dimming up the lights in his room and increasing the thermostat when he is in his lightest stage of sleep, as close to 6:00 am as possible; the comparing module 215-*b* may therefore receive the sleep data indicating the appropriate stage of sleep, and identity data from user identification module 445 indicating the particular user sleeping, and may implement the appropriate "wakeup profile" for the identified user accordingly. Similarly, a user issuing a voice command may be identified using voice recognition systems, and one or more home automation system operation profile corresponding to the identified user may be implemented accordingly. In this way, various operation profiles specific to individual users may be implemented with specificity. For example, one user speaking the command, "Vivint, I'm home," may prefer that all interior lights be turned on, the security system disarmed, and the thermostat set to 70 degrees. In another example, a second user speaking the same command, "Vivint, I'm home," may prefer that only lights in the kitchen and living room be turned on, that the security system remain armed with the exception of motion detectors, and that the thermostat be set to 68 degrees, for example. By identifying the user issuing the verbal or gestural command, or by identifying the user approaching an entry or exit point of the home, the home automation system may implement one or more system operation profile specific to the identified user.

Apparatus 205-*b* may also include components for bi-directional data communications including components for transmitting communications and components for receiving communications. For example, apparatus 205-*b* may communicate sleep data, input regarding at least one home automation system operation profile, and derived action instructions for at least one aspect of the home automation system bi-directionally with one or more of a local computing device 115-*a*, a remote server 130-*a*, and/or a remote computing device 140-*a*. This bi-directional communication may be direct (e.g., apparatus 205-*b* communicating directly with local computing device 115-*a*) or indirect (e.g., apparatus 205-*b* communicating with remote computing device 140-*a* via remote server 130-*a*). Remote server 130-*a*, remote computing device 140-*a*, and local computing device 115-*a* may be examples of remote server 130, remote computing device 140, and local computing device 115, 120 as shown with respect to FIG. 1.

As previously discussed, the comparing module 215-*b* may receive sleep data or other user data and input regarding at least one home automation system operation profile, and may compare the received sleep data or other user data with the received input regarding the home automation system operation profiles. In this way, comparing module 215-*b* may be operable to implement home automation system operation profiles without the need for direct user input.

Apparatus 205-*b* may also include a processor module 405, and a memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 130-*a* or local computing device 115-*a*. The transceiver module 430 may include a modem to modulate the packets and provide the modulated packets to the one or more antennas 435 for transmission, and to demodulate packets received from the one or more antennas 435. While an apparatus comprising a control panel (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 130-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive sleep data and input regarding at least one home automation system operation profile, compare the received sleep data with the input regarding at least one home automation system operation profile, operate at least one aspect of the home automation system, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. For example, the comparing module 215-*b* may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, bed pad sensor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
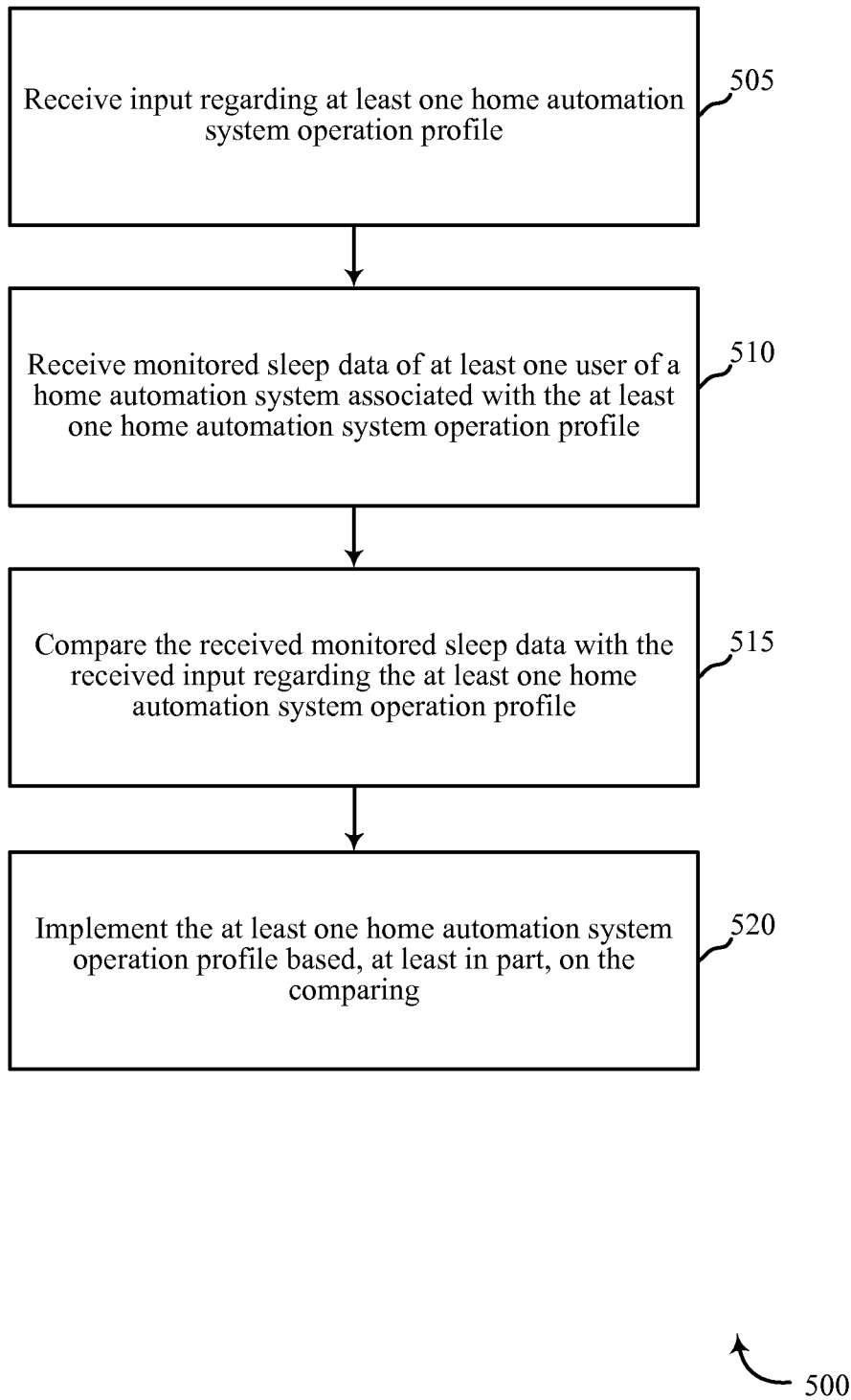
FIG. 5 is a flow chart illustrating an example of a method relating to a security and/or automation system, in accordance with various aspects of this disclosure.

FIG. 5 is a flow chart illustrating an example of a method 500 for security and/or automation systems, in accordance with various embodiments. For clarity, the method 500 is described below with reference to aspects of one or more of the sensor units 110, local computing device 115, 120, control panel 135, and/or remote computing device 140 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 505, the method 500 may include receiving input regarding at least one home automation system operation profile. As previously stated, a user may input preferences regarding at least one home automation system operation profile to be implemented. For example, a user may input at a control panel, or at a dedicated application on a local or remote computing device, preferences for various components of the home automation system to be activated, deactivated, or modified based upon a detected sleep state of one or more occupant of the home. The user may input various profiles associated with various sleep states for individual users, profiles associated with all users, and various combinations thereof. For example, a user may input a "wakeup profile" for each individual occupant of the home, or for all occupants combined. Thus, the "wakeup profile" for the head of the household may include turning on lights and deactivating security systems based on the system detecting that the head of the household has awoken, while a "wakeup profile" for a baby in the home may include turning on hallway lights and deactivating motion sensors between the master bedroom and nursery to allow a parent to walk to the nursery to care for the baby, and further a "wakeup profile" for all users may include deactivating motion sensors if any home occupant wakes up and gets out of bed. User inputted profile preferences may also include preferences related to receiving sleep status reports. For example, in addition to being awoken by gradually up-dimmed lights, one user may also input a request to receive a report detailing the quality of his sleep based on, for example, monitored body temperature, motion, audio, and the like, upon waking. In addition, user inputted profile preferences may relate to verbal or gestural commands, or to detected user locations or movement in and around the home or property. For example, a user may input a profile preference relating to a "return home profile," indicating that, upon detecting that the user has returned home and is approaching the front door, the home automation system implements various functionalities, such as unlocking the door, turning on lights, adjusting the thermostat, and the like.

In some embodiments, home automation system operation profiles may relate to system functionalities within the home, without requiring the user to be returning to or leaving from the home. For example, a user may speak the verbal command, "Vivint, turn off the lights," which may indicate for one identified user that only the lights in the room currently occupied by the user should be turned off, while for a second identified user the command may indicate that all lights in the home should be turned off. Similarly, a user giving a gestural command, or moving from one room to another within the home, may trigger one or more home automation system operation profiles based on user inputted preferences.

At block 510, the method 500 may include receiving monitored sleep data of at least one user of a home automation system associated with the at least one home automation system operation profile. Sleep data may be monitored by one or more sensor unit, local computing device, control panel, or remote computing device, or may be inputted directly by the user at the same. For example, one or more sensor unit may detect a sleep state for one or more user by monitoring any of motion, audio, vibration, body temperature, heartbeat, breathing, location, weight, pressure, or the like. In one embodiment, a user may input sleep data at, for example, a dedicated application on his smartphone, for example indicating that he is in bed and preparing to go to sleep, or that he has awoken. The received monitored sleep data may relate to a single user, or may pertain to a plurality of users in the home. The received monitored sleep data may indicate various aspects of sleep for the one or more users. For example, the monitored sleep data may indicate merely whether one or more users are in bed, for example by detecting pressure on a bed pad monitor under the mattress. Alternatively or in addition, the monitored sleep data may indicate whether one or more users are asleep or awake, for example by detecting movement, heart rate, respiration rate, and the like. Further still, the monitored sleep data may indicate quality of sleep or position of the one or more user in the sleep cycle, for example by monitoring body temperature, audio such as snoring, movement, and the like. Individual user physiological parameters may be taken into account when determining the user's sleep state. For example, a user may input at the home automation system details such as his age, weight, resting heart rate, and the like such that the system may determine the user's sleep state according to his individual health status. In addition or in the alternative, at block 510, the method 500 may include receiving monitored user data such as a detected verbal command, such as, "Vivint, I'm leaving." Other user data may include gestural commands, or user location or movement throughout the home or property, indicating, for example, that a user is entering or exiting the home.

At block 515, the method 500 may include comparing the received monitored sleep data or other user data with the received input regarding the at least one home automation system operation profile. In this way, received monitored sleep data or other user data may be associated with an identified user, and may then be compared with the corresponding operation profiles inputted by or for the identified user and appropriate for the identified user's received sleep status or location. For example, one user may have inputted multiple operation profiles corresponding to various sleep states, such as a "nighttime shutdown profile," a "midnight wakeup profile," a "morning wakeup profile," and a "sleep improvement profile." These profiles may or may not correspond with profiles inputted by the other occupants of the home. Accordingly, at block 515, received monitored sleep data or other user data may be associated with the appropriate user inputted operation profile(s).

At block 520, the method 500 may include implementing the at least one home automation system operation profile based, at least in part, on the comparing. For example, where the received monitored sleep data for John indicates that he is asleep but is sleeping restlessly, the "sleep improvement profile" may be associated with the sleep data to derive an action instruction to adjust the thermostat in John's room to a temperature more conducive to quality sleep. This action instruction may be communicated to the thermostat, which may implement the operation profile accordingly. In some embodiments, the "sleep improvement profile" action instruction may be communicated to a smartphone or personal computing device located near or worn by John, where the action instruction may cause the computing device to vibrate in order to promote sleep or calm. In some embodiments the inputted operation profile may pertain to only one component of the home automation system, while in other embodiments the operation profile may be communicated to and implemented by a plurality of components of the home automation system. In some embodiments, the implemented operation profile may include providing a sleep status report to one or more users, presenting information regarding the quality of one or more users' sleep the previous night, and/or information regarding the current sleep status of other occupants in the home.

The operations at blocks 505, 510, 515, and 520 may be performed using the receiver module 210, 210-*a*, the comparing module 215, 215-*a*, 215-*b*, the transmitter module 220, 220-*a*, and/or the transceiver module 430, described with reference to FIGS. 2-4.

Thus, the method 500 may provide for sleep or other user action monitoring methods related to a security and/or automation system. It should be noted that the method 500 is just one implementation and that the operations of the method 500 may be rearranged or otherwise modified such that other implementations are possible.

Figure 6:
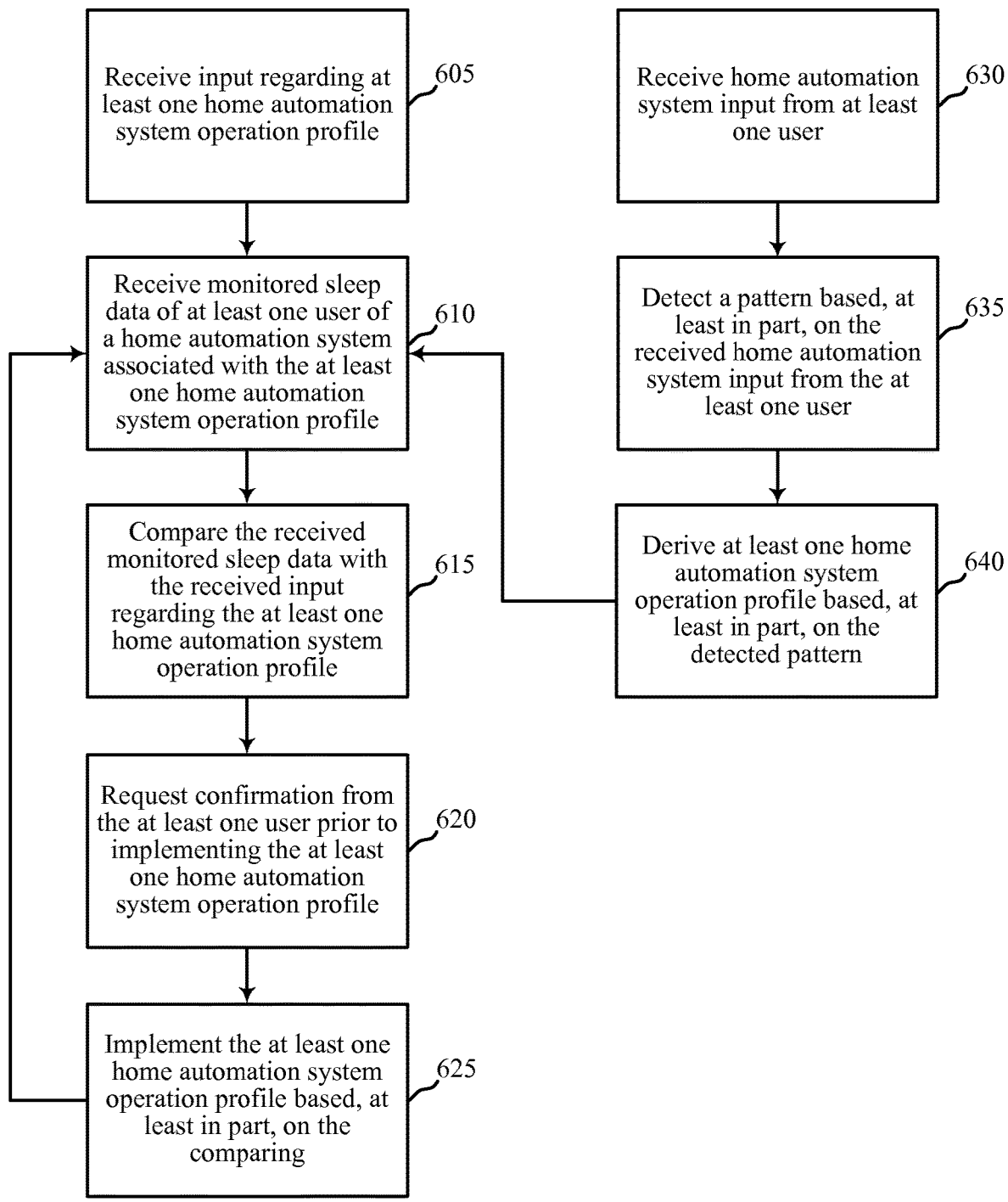
FIG. 6 is a flow chart illustrating an example of a method relating to a security and/or automation system, in accordance with various aspects of this disclosure.

FIG. 6 is a flowchart illustrating an example of a method 600 for receiving input and sleep data regarding at least one home automation system operation profile, and comparing the received input with the received sleep data, in accordance with various aspects of the present disclosure. For clarity, the method 600 is described below with reference to aspects of one or more of the sensor units 110, local computing device 115, 120, control panel 135, and/or remote computing device 140 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

Blocks 605, 610, and 615 of method 600 may correlate to blocks 505, 510, and 515 as illustrated with respect to method 500 in FIG. 5. Specifically, block 605 of method 600 may include receiving input regarding at least one home automation system operation profile; block 610 may include receiving monitored sleep data of at least one user of a home automation system associated with the at least one home automation system operation profile; and block 615 may include comparing the received monitored sleep data with the received input regarding the at least one home automation system operation profile.

At block 620, the method 600 may include requesting confirmation from the at least one user prior to implementing the at least one home automation system operation profile. As previously discussed with respect to FIG. 3, in some embodiments a confirmation request may be communicated to a user prior to implementing operation profiles, such that the user may approve or disapprove of the actions to be taken. In some embodiments, the user may receive the confirmation request at a smartphone or personal computer, or in other embodiments at a control panel, and the user may elect to approve some, all, or none of the actions requested to be taken by one or more components of the home automation system.

At block 625, the method 600 may include implementing the at least one home automation system operation profile based, at least in part, on the comparing. In embodiments where the user does not give approval to implement the operation profile at block 620, the method may not proceed to block 625. However, where the user gives approval at block 620, the method may proceed at block 625 to implement at least one of the operation profiles. As previously discussed with respect to FIGS. 2-3, implementing the at least one operation profile may comprise deriving at least one action instruction and communicating the at least one action instruction to the appropriate at least one component of the home automation system. For example, the at least one home automation system operation profile to be implemented may include preferences to arm a security system, turn off interior lights, set a thermostat to 68 degrees, and the like. Accordingly, at block 625, action instructions corresponding to each preference in the operation profile may be derived and communicated to the appropriate home automation system component; namely, the security system panel, home lighting component, and thermostat panel.

The method 600 may include continuously receiving monitored sleep data and continuously comparing the received monitored sleep data with the received input regarding the at least one home automation system operation profile. Accordingly, block 625 may cycle back to block 610 of method 600 any number of times. In this way, home automation system operations may be continuously updated based on changing monitored sleep data. For example, initially monitored sleep data may indicate that a "nighttime shutdown profile" should be implemented. However, later that night, updated sleep data may indicate that a "midnight wakeup profile" should be implemented, for example because a baby has awoken. Accordingly, the home automation system may continue to implement those aspects of the "nighttime shutdown profile" not impacted by the "midnight wakeup profile," such as exterior door locks, but may also begin implementing the "midnight wakeup profile," such as turning on hallway lights and disarming motion sensors. Subsequently monitored sleep data may indicate that the baby and the parent have gone back to sleep, and the system may return to implementing all aspects of the "nighttime shutdown profile." In this way, home automation system component operations may be continuously updated based on changing occupant circumstances without the need for the user to remember to disarm systems or perform any of the other automated aspects himself.

In an alternative or additional embodiment, at block 630, the method 600 may include receiving home automation system input from at least one user. Rather than, or in addition to, receiving input regarding a home automation system operation profile as detailed in block 605, this step may instead consist of the home automation system "observing" manual user input with respect to various aspects of the home automation system. For example, the home automation system may detect that a user is arming his security system, turning off the interior lights, turning on the exterior lights, locking exterior doors, and adjusting the thermostat to 68 degrees. At block 635, the method 600 may include detecting, at the home automation system, a pattern based on the received home automation system input from the at least one user. Thus, the home automation system may detect that the user is taking each of the above listed steps every night from bed, once the other occupants of the home are already asleep.

At block 640, the method 600 may include deriving at least one home automation system operation profile based, at least in part, on the detected pattern. In the present example, the system may derive a "nighttime shutdown profile" to implement each aspect of the home automation system which the user has been activating manually. In this way, the home automation device may automatically determine one or more operation profiles based on observed patterns in user behavior, such that a user need not manually input his desired operation profiles.

Upon deriving the at least one home automation system operation profile at block 640, the method 600 may proceed to block 610, to receive monitored sleep data of at least one user at the home automation system associated with the at least one home automation system operation profile. The method 600 may then proceed to blocks 615, 620, and 625 as detailed above. Specifically, the method 600 may include comparing the received monitored sleep data with the received input regarding the at least one home automation system operation profile at block 615. In this instance, the received input regarding the at least one home automation system operation profile is received based upon the pattern of user behavior observed by the home automation system and the subsequently derived operation profile. The method 600 may then proceed to block 620, in which the home automation system may request confirmation from the at least one use prior to implementing the at least one home automation system operation profile. Should the user provide confirmation in response to the request, the method 600 may proceed to block 625, to implement the at least one home automation system operation profile based, at least in part, on the comparing. As previously discussed, the method 600 may then return to block 610, such that the received monitored sleep data may be continuously updated, and such that the implementation of the home automation system operation profile may similarly be continuously updated based on current user sleep status.

Thus, the method 600 may provide for monitoring sleep data and implementing home automation system operation profiles accordingly. Although described with respect to monitoring sleep data, the method 600 may additionally or alternatively include monitoring other user data, such as voice commands, gestural commands, user movement, and/or user location, such that at least one home automation system operation profile may be implemented based, at least in part, on the received user data. It should be noted that the method 600 is just one implementation and that the operations of the method 600 may be rearranged or otherwise modified such that other implementations are possible.

Figure 7:
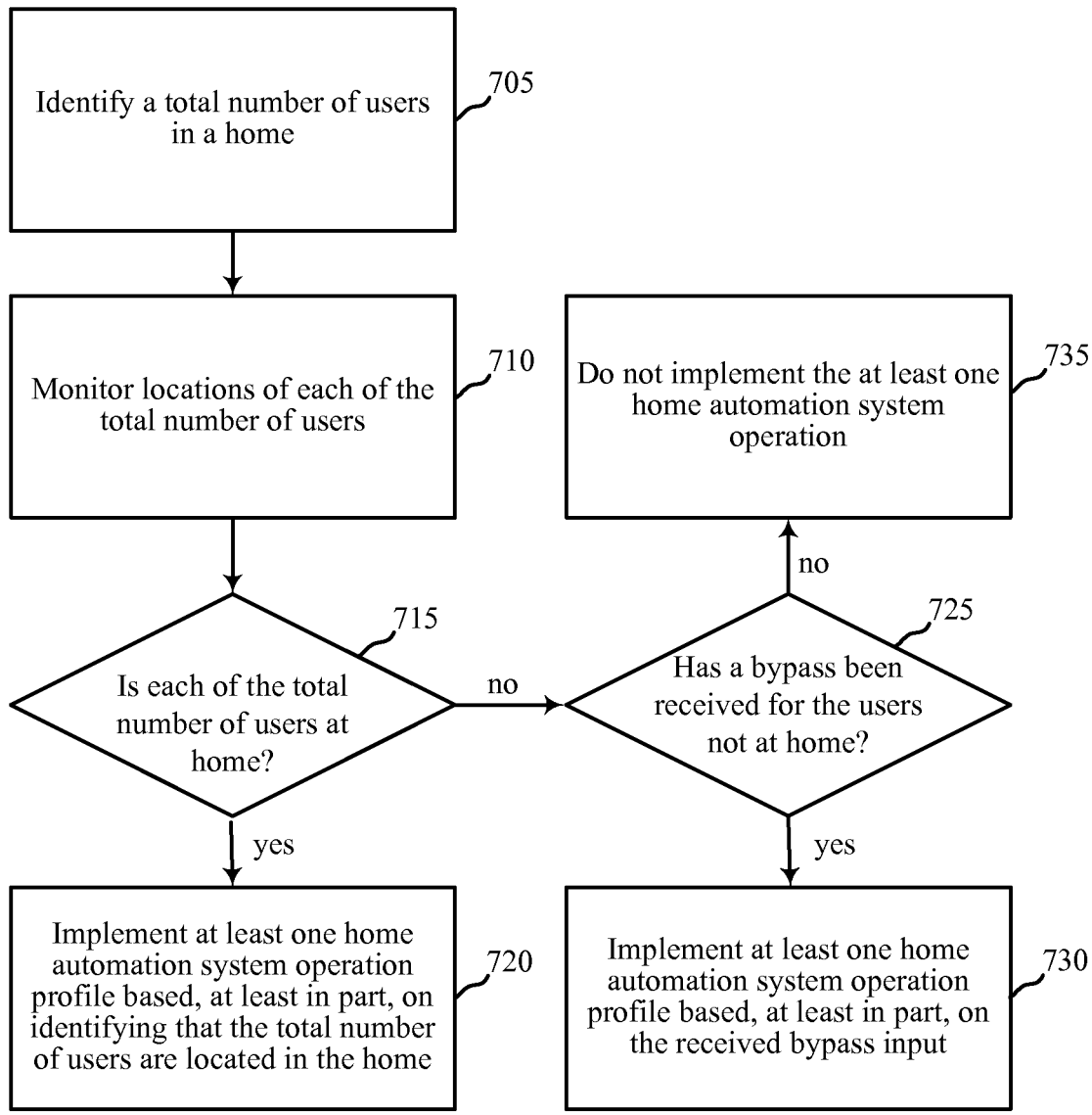
FIG. 7 is a flow chart illustrating an example of a method relating to a security and/or automation system, in accordance with various aspects of this disclosure.

FIG. 7 is a flowchart illustrating an example of a method 700 for implementing at least one home automation system operation profile based, at least in part, on detected occupancy data, in accordance with various aspects of the present disclosure. For clarity, the method 700 is described below with reference to aspects of one or more of the sensor units 110, local computing device 115, 120, control panel 135, and/or remote computing device 140 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include identifying a total number of users or occupants in a home. This may be achieved by any known means, including monitoring audio, visual, body heat, heartbeat, respiration, motion, and other acceptable sensors. In other embodiments, the total number of users or occupants in the home may be inputted directly by a user, for example at a control panel or local computing device.

At block 710, the method 700 may include monitoring locations of each of the identified users. This may also be achieved by any known means, for example using global positioning technology, receiving signals from users' smartphones or personal computers, or accessing users' digital calendars. In other embodiments, users may input their location information at, for example, a dedicated application on a smartphone or personal computer. In this way, the home automation system may stay apprised of the locations of each registered user outside and inside the home.

At block 715, the method 700 may include determining whether each of the total number of users is at home. This may be achieved by monitoring occupancy data in the home using any known means, as discussed above. In some embodiments, the users may be determined to be at home on the basis that they are in bed, for example using bed pad sensors, while in other embodiments the system may determine merely that the users are present in the home.

If, at block 715, it is determined that each of the total number of users is at home, the method 700 may proceed to block 720, which may include implementing at least one home automation system operation profile based, at least in part, on identifying that the total number of users are located in the home. By monitoring the total number of occupants in a home and each of their locations, the home automation system may be able to ensure that, for example, a "nighttime shutdown profile" is only implemented once all home occupants are safely inside the house.

If, at block 715, it is instead determined that each of the total number of users is not at home, the method may proceed to block 725. In some embodiments, it may be preferable to provide a bypass for at least one of the total number of users. For example, if one family member is travelling for three days, it may be desirable for the home automation system to still implement a "nighttime shutdown profile" despite that family member's absence, so that the home may be secured. Thus, at block 725, the method 700 may include determining whether a bypass input has been received for the users determined to not be at home. This bypass input may be received at any of a control panel or dedicated application on a smartphone or personal computing device, for example. In other embodiments, the bypass input may be derived automatically by the home automation system by monitoring the one or more user's location. For example, the home automation system may access the user's calendar to know that the user will be on a work trip for three days, and may derive a bypass accordingly. In another example, the home automation system may detect the user's location in another state, for example by receiving a signal from the user's smartphone, and may derive a bypass accordingly.

If, at block 725, it is determined that a bypass has been received for the one or more users determined to not be at home, the method 700 may proceed to block 730, which may include implementing at least one home automation system operation profile based, at least in part, on the received bypass input. Thus, the home automation system may implement at least one operation profile upon detecting that all approved users in the household, with the exception of those for whom the system has received or derived a bypass, are at home. In this way, the various aspects of the home automation system may continue to be implemented on an automatic basis without the need for a user to, for example, manually adjust the system settings based on various family members' schedules.

If, however, at block 725, it is determined that a bypass has not been received for the users determined not to be at home, the method 700 may proceed to block 735, which may include not implementing the at least one home automation system operation. This may be useful, for example, to avoid arming a security alarm system before all family members have arrived home.

Thus, the method 700 may provide for adaptively updating the implementation of home automation system operation profiles. It should be noted that the method 700 is just one implementation and that the operations of the method 700 may be rearranged or otherwise modified such that other implementations are possible.

In some examples, aspects from two or more of the methods 500, 600, 700 may be combined and/or separated. It should be noted that the methods 500, 600, 700 are just example implementations, and that the operations of the methods 500-700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security or automation systems, comprising:

identifying a quantity of users associated with a home automation device;

monitoring a location of each of the identified users relative to the home automation device;

detecting a pattern in a user-defined input regarding at least one home automation system operation profile associated with a user of the identified users based at least in part on monitoring the location of each of the identified users, the user-defined input corresponding to a home automation function of the home automation device and at least one physiological parameter of the user;

identifying a home automation system operation profile based at least in part on detecting the pattern;

receiving monitored sleep data of at least one user of a home automation system associated with the identified at least one home automation system operation profile;

determining a quality of sleep of the at least one user of the home automation system based at least in part on receiving the monitored sleep data, wherein determining the quality of sleep of the at least one user comprises monitoring a body temperature and one or more motions of the user;

analyzing the received monitored sleep data and the determined quality of sleep of the at least one user of the home automation system to determine one or more sleep states of the at least one user determining whether the user is associated with the received monitored sleep data based at least in part on analyzing the received monitored sleep data;

comparing the received monitored sleep data with the at least one home automation system operation profile associated with the user based, at least in part, on the determining;

determining whether a parameter of the received monitored sleep data is associated with a parameter of the home automation system operation profile based, at least in part, on comparing the received monitored sleep data with the at least one home automation system operation profile; and implementing the at least one home automation system operation profile associated with the user based, at least in part, on identifying the quantity of users associated with the home automation device, detecting the pattern in the user-defined input, identifying the home automation system operation profile, and determining that the parameter of the received monitored sleep data is associated with the parameter of the home automation system operation profile, wherein the implementing comprises adjusting the home automation function of the home automation device.

2. The method of claim 1, further comprising:
continuously receiving monitored sleep data of the at least one user;
continuously comparing the received monitored sleep data with the received input regarding the at least one home automation system operation profile; and
continuously updating the implementation of the at least one home automation system operation profile based, at least in part, on the comparing.

3. The method of claim 1, further comprising:
requesting confirmation from the at least one user prior to implementing the at least one home automation system operation profile.

4. The method of claim 1, further comprising:
receiving input regarding a sleep data threshold; and
implementing the at least one home automation system operation profile based, at least in part, on the monitored sleep data meeting or exceeding the sleep data threshold.

5. The method of claim 1, further comprising:
receiving any of monitored location data, monitored auditory data, monitored gestural data of the at least one user, or a combination thereof; and
implementing the at least one home automation system operation profile based, at least in part, on the monitored data.

6. The method of claim 1, further comprising:
providing a report based, at least in part, on the monitored sleep data of the at least one user.

7. The method of claim 1, wherein the at least one home automation system operation profile is any of a home shutdown profile, a home wakeup profile, a home lockup profile, a return home profile, or a home sick profile, or a combination thereof.

8. The method of claim 7, wherein the at least one home automation system operation profile comprises any of operating a security system, lights, thermostat or HVAC system, door locking mechanism, alarm clock, personal computing device, doorbell, or motion sensors, or a combination thereof.

9. The method of claim 1, wherein the monitored sleep data comprises at least one of pressure, weight, respiration rate, heart rate, motion, audio, or status in a sleep cycle, or a combination thereof.

10. An apparatus for security or automation systems, comprising:
a processor;
memory in electronic communication with the processor; and
instructions stored in the memory, the instructions being executable by the processor to:
identify a quantity of users associated with a home automation device;
monitor a location of each of the identified users relative to the home automation device;
detect a pattern in a user-defined input regarding at least one home automation system operation profile associated with a user of the identified users based at least in part on monitoring the location of each of the identified users, the user-defined input corresponding to a home automation function of the home automation device and at least one physiological parameter of the user;
identify a home automation system operation profile based at least in part on detecting the pattern;
receive monitored sleep data of at least one user of a home automation system associated with the identified home automation system operation profile;
determine a quality of sleep of the at least one user of the home automation system based at least in part on receiving the monitored sleep data, wherein determining the quality of sleep of the at least one user comprises monitoring a body temperature and one or more motions of the user;
analyze the received monitored sleep data and the determined quality of sleep of the at least one user of the home automation system to determine one or more sleep states of the at least one user;
determine whether the user is associated with the received monitored sleep data based at least in part on analyzing the received monitored sleep data;
determine whether the user is associated with the received monitored sleep data based at least in part on one or more characteristics of the monitored sleep data;
compare the received monitored sleep data with the at least one home automation system operation profile associated with the user based, at least in part, on the determining;
determine whether a parameter of the received monitored sleep data is associated with a parameter of the home automation system operation profile based, at least in part, on comparing the received monitored sleep data with the at least one home automation system operation profile; and
implement the at least one home automation system operation profile associated with the user based, at least in part, on identifying the quantity of users associated with the home automation device, detecting the pattern in the user-defined input, identifying the home automation system operation profile, and determining that the parameter of the received monitored sleep data is associated with the parameter of the home automation system operation profile, wherein the implementing comprises adjusting the home automation function of the home automation device.

11. The apparatus of claim 10, wherein the processor is further configured to:
continuously receive monitored sleep data of the at least one user;
continuously compare the received monitored sleep data with the received input regarding the at least one home automation system operation profile; and
continuously update the implementation of the at least one home automation system operation profile based, at least in part, on the comparing.

12. The apparatus of claim 10, wherein the processor is further configured to:
receive input regarding a sleep data threshold; and
implement the at least one home automation system operation profile based, at least in part, on the monitored sleep data meeting or exceeding the sleep data threshold.

13. The apparatus of claim 10, wherein the processor is further configured to:
receive any of monitored location data, monitored auditory data, monitored gestural data of the at least one user, or a combination thereof; and implement the at least one home automation system operation profile based, at least in part, on the monitored data.

14. The apparatus of claim 10, wherein the at least one home automation system operation profile is any of a home shutdown profile, a home wakeup profile, a home lockup profile, a return home profile, or a home sick profile, or a combination thereof.

15. The apparatus of claim 14, wherein the at least one home automation system operation profile comprises any of operating a security system, lights, thermostat or HVAC system, door locking mechanism, alarm clock, personal computing device, doorbell, or motion sensors, or a combination thereof.

16. The apparatus of claim 10, wherein the monitored sleep data comprises at least one of pressure, weight, respiration rate, heart rate, motion, audio, or status in a sleep cycle, or a combination thereof.

17. A non-transitory computer-readable medium storing computer-executable code, the code executable by a processor to:
  identify a quantity of users associated with a home automation device;
  monitor a location of each of the identified users relative to the home automation device;
  detect a pattern in a user-defined input regarding at least one home automation system operation profile associated with a user of the identified users based at least in part on monitoring the location of each of the identified users, the user-defined input corresponding to a home automaton function of the home automation device and at least one physiological parameter of the user;
  identify a home automation system operation profile based at least in part on detecting the pattern;
  receive monitored sleep data of at least one user of a home automation system associated with the identified home automation system operation profile;
  determine whether the user is associated with the received monitored sleep data based at least in part on one or more characteristics of the monitored sleep data and determine a quality of sleep of the at least one user of the home automation system based at least in part on receiving the monitored sleep data, wherein determining the quality of sleep of the at least one user comprises monitoring a body temperature and one or more motions of the user;
  analyze the received monitored sleep data and the determined quality of sleep of the at least one user of the home automation system to determine one or more sleep states of the at least one user;
  determine whether the user is associated with the received monitored sleep data based at least in part on analyzing the received monitored sleep data;
  compare the received monitored sleep data with the at least one home automation system operation profile associated with the user based, at least in part, on the determining;
  determine whether a parameter of the received monitored sleep data is associated with a parameter of the home automation system operation profile based, at least in part, on comparing the received monitored sleep data with the at least one home automation system operation profile; and
  implement the at least one home automation system operation profile associated with the user based, at least in part, on identifying the quantity of users associated with the home automation device, detecting the pattern in the user-defined input, identifying the home automation system operation profile, and determining that the parameter of the received monitored sleep data is associated with the parameter of the home automation system operation profile, wherein the implementing comprises adjusting the home automation function of the home automation device.

* * * * *